US007616242B2

United States Patent
Ando et al.

(10) Patent No.: US 7,616,242 B2
(45) Date of Patent: Nov. 10, 2009

(54) LINEAR-LOGARITHMIC PIXEL SENSORS AND GAIN CONTROL CIRCUITS THEREFOR

(75) Inventors: Haruhisa Ando, Tokyo (JP); Isao Takayanagi, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 1000 days.

(21) Appl. No.: 10/869,420

(22) Filed: Jun. 16, 2004

(65) Prior Publication Data

US 2004/0233313 A1 Nov. 25, 2004

Related U.S. Application Data

(63) Continuation-in-part of application No. 10/226,127, filed on Aug. 23, 2002, now Pat. No. 7,443,427.

(51) Int. Cl.
| | |
|---|---|
| H04N 3/14 | (2006.01) |
| H04N 5/335 | (2006.01) |
| H01L 31/062 | (2006.01) |
| H01L 31/113 | (2006.01) |

(52) U.S. Cl. .................. 348/301; 348/294; 348/308; 257/292

(58) Field of Classification Search ............ 348/294, 348/300–302, 308; 250/208.1; 257/291–292; 330/278–279, 282–283
See application file for complete search history.

(56) References Cited

U.S. PATENT DOCUMENTS 6,191,408 B1 2/2001 Shinotsuka et al.

(Continued)

FOREIGN PATENT DOCUMENTS

EP 0828297 A2 3/1998

(Continued)

OTHER PUBLICATIONS

Ricquier et al., N., "Active Pixel CMOS Image Sensor with On-Chip Non-Uniformity Correction".

(Continued)

*Primary Examiner*—Sinh Tran
*Assistant Examiner*—Daniel M Pasiewicz
(74) *Attorney, Agent, or Firm*—Jones Day; Edward L. Pencoske

(57) ABSTRACT

A system and method are disclosed to enlarge the sub-threshold current coefficient "α" of a reset transistor connected to a photodiode in an L-L (Linear Logarithmic) pixel sensor without modifying any semiconductor process parameters. In one embodiment, a coupling capacitor is introduced between the gate and source terminals of the reset transistor. The gate node of the reset transistor is kept floating and the change in its source voltage Vs is coupled to its gate voltage Vg by a certain rate with the help of the coupling capacitor. Thus, an effective change in (Vg-Vs) is made small, which is equivalent to enlarging the sub-threshold coefficient "α" In this manner, the signal gain in the logarithmic region of operation of the pixel sensor can be controlled by changing the coupling capacitance between the source and gate terminals of the reset transistor connected to the photodiode. The signal conversion gain in the logarithmic region is increased, but the gain in the linear region is unchanged. In one embodiment, the stray capacitance (which also affects the value of the enlarged "α") present at the gate terminal of the reset transistor is externally controlled to achieve adaptive gain control of the output signal in the logarithmic region so as to obtain large output photo voltage swings even under varying light conditions. Because of the rules governing abstracts, this abstract should not be relied upon in construing the claims.

22 Claims, 9 Drawing Sheets

U.S. PATENT DOCUMENTS

| | | |
|---|---|---|
| 6,246,436 B1 * | 6/2001 | Lin et al. .................... 348/308 |
| 6,512,544 B1 * | 1/2003 | Merrill et al. ............... 348/302 |
| 6,903,394 B2 * | 6/2005 | Agarwal ..................... 257/292 |
| 2002/0033445 A1 | 3/2002 | Mattison |
| 2005/0062867 A1 * | 3/2005 | Mabuchi .................... 348/308 |

FOREIGN PATENT DOCUMENTS

| | | |
|---|---|---|
| EP | 0933928 A2 | 4/1999 |
| EP | 1187217 A2 | 3/2002 |
| WO | WO 9953687 A1 * | 10/1999 |

OTHER PUBLICATIONS

Kavadias et al., S., "P8: On-chip offset calibrated logarithmic response image sensor", pp. 68-71.

Sasaki et al., M., "P4 A CMOS Image Sensor Integrating Gamma Correction and Gain Control Functions", pp. 52-55.

Fox et al., E., "Wide-Dynamic-Range Pixel with Combined Linear and Logarithmic Response and Increased Signal Swing".

* cited by examiner

LINEAR-LOGARITHMIC PIXEL SENSORS AND GAIN CONTROL CIRCUITS THEREFOR

REFERENCE TO RELATED APPLICATION

The present application is a continuation-in-part of and claims priority benefits of the earlier filed U.S. non-provisional patent application Ser. No. 10/226,127, titled "Wide Dynamic Range Linear-and-Log Active Pixel," filed on Aug. 23, 2002 now U.S. Pat. No. 7,443,427, the entirety of which is hereby incorporated by reference.

BACKGROUND

1. Field of the Disclosure

The present disclosure generally relates to pixel circuits and to a gain control circuit for linear-logarithmic (L-L) pixel sensors.

2. Brief Description of Related Art

Imaging systems often need to have pixels capable of handling a wide dynamic range to accommodate varying brightness levels of an imaged scene. Further, it may be desirable to control the signal conversion gain of pixel circuits to obtain large output signal voltage swings throughout the dynamic range of the pixel circuit. Several different pixel circuit architectures have been developed for this purpose. However, they generally increase pixel circuit complexity and present difficulties such as increased pixel size, non-linear response characteristics, and pixel-to-pixel signal deviations, among others. It is also desirable that the gain control of a pixel circuit be achieved without modifying any semiconductor process parameters such as dielectric layer thickness or substrate impurity profile.

SUMMARY

The present disclosure contemplates a simple pixel architecture which achieves increased dynamic range by having both a linear and a logarithmic response characteristic. A method of operating the pixel is also provided.

In one aspect, a pixel circuit according to present disclosure has an integration node; a conversion transistor having a source/drain connected to the integration node and a drain/source connected to a reset line; a feed-through pulse capacitor having one leg connected to a feed-through pulse signal line and the other leg connected to the integration node; a photodiode having one leg connected to the integration node; and an output transistor having a gate connected to the integration node. The pixel circuit operates in a linear mode when the integrated charge at the node is at a lower level which causes the conversion transistor to operate in an shut-off mode and operate in a logarithmic mode when the integrated charge is at a higher level which causes the conversion transistor operates in a sub-threshold mode.

In yet another aspect the disclosure provides a method of operating the pixel circuit. The method includes operating the reset and feed through pulse signal lines to provide a maximum reset voltage at a pixel integration node, providing the reset voltage as a reset output signal through an output transistor, accumulating charge at the node with the photodiode during an accumulation period in which the conversion transistor operates first in an shut-off range and, if needed, then in a sub-threshold range to produce an image signal at the node, and providing the image signal as a pixel output signal through the output transistor.

In one embodiment, the present disclosure contemplates a method of operating a pixel circuit. The method comprises linearly collecting photogenerated charge using a transistor when the amount of the collected charge is below a threshold value; logarithmically collecting the photogenerated charge by operating a transistor in a sub-threshold mode when the amount of the collected charge is above the threshold value; and controlling the gain of the transistor during the logarithmically collecting step.

In another embodiment, the present disclosure contemplates a method of operating a pixel circuit. The method includes collecting photogenerated charge at an integration node in response to a pixel signal during a charge integration period by operating a transistor in a shut-off mode when the amount of the collected charge is below a threshold value to cause charge to be linearly collected at the node, and by operating the transistor in a sub-threshold mode when the collected charge is above the threshold to cause charge to be logarithmically collected at the node; and enlarging a sub-threshold current coefficient of the transistor when the transistor is operated in the sub-threshold mode.

In a further embodiment, the present disclosure contemplates a pixel circuit. The pixel circuit comprises a photoconversion device for providing photogenerated charge during a charge integration period; a transistor connected to the photoconversion device and operative during the charge integration period to provide a linear accumulation of charge from the photoconversion device up to a predetermined charge level, and to provide a logarithmic accumulation of charge from the photoconversion device after the predetermined charge level is reached; and a control circuit connected to the transistor for controlling the gain of the transistor during the logarithmic accumulation of charge.

In a still further embodiment, the present disclosure contemplates a method of controlling output signal gain of a transistor operated in a sub-threshold mode. The method comprises connecting a capacitive element between the gate and source terminals of the transistor; and operating the transistor in a floating-gate state.

The present disclosure teaches a system and method to enlarge the sub-threshold current coefficient "α" of a reset transistor connected to a photodiode in an L-L (Linear Logarithmic) pixel sensor without modifying any semiconductor process parameters. In one embodiment, a coupling capacitor is introduced between the gate and source terminals of the reset transistor. The gate node of the reset transistor is kept floating and the change in its source voltage Vs is coupled to its gate voltage Vg by a certain rate with the help of the coupling capacitor. Thus, an effective change in (Vg-Vs) is made small, which is equivalent to enlarging the sub-threshold coefficient "α" In this manner, the signal gain in the logarithmic region of operation of the pixel sensor can be controlled by changing the coupling capacitance between the source and gate terminals of the reset transistor connected to the photodiode. The signal conversion gain in the logarithmic region is increased, but the gain in the linear region is unchanged. In one embodiment, the stray capacitance (which also affects the value of the enlarged "α") present at the gate terminal of the reset transistor is externally controlled to achieve adaptive gain control of the output signal in the logarithmic region so as to obtain large output photo voltage swings even under varying light conditions.

BRIEF DESCRIPTION OF THE DRAWINGS

For the present disclosure to be easily understood and readily practiced, the present disclosure will now be described for purposes of illustration and not limitation, in connection with the following figures, wherein.

DETAILED DESCRIPTION

Reference will now be made in detail to some embodiments of the present disclosure, examples of which are illustrated in the accompanying drawings. It is to be understood that the figures and descriptions of the present disclosure included herein illustrate and describe elements that are of particular relevance to the present disclosure, while eliminating, for the sake of clarity, other elements found in typical CMOS imaging devices. It is noted at the outset that the terms "connected", "connecting," "electrically connected," etc., are used interchangeably herein to generally refer to the condition of being electrically connected. It is further noted that various waveforms shown and discussed herein are with reference to positive logic, i.e., a high value on a signal is treated as a logic "1" whereas a low value is treated as a logic "0. " However, as is known in the art, any of such waveforms may be easily plotted in negative logic (i.e., a high value on a signal is treated as a logic "0" whereas a low value is treated as a logic "1").

Figure 1:
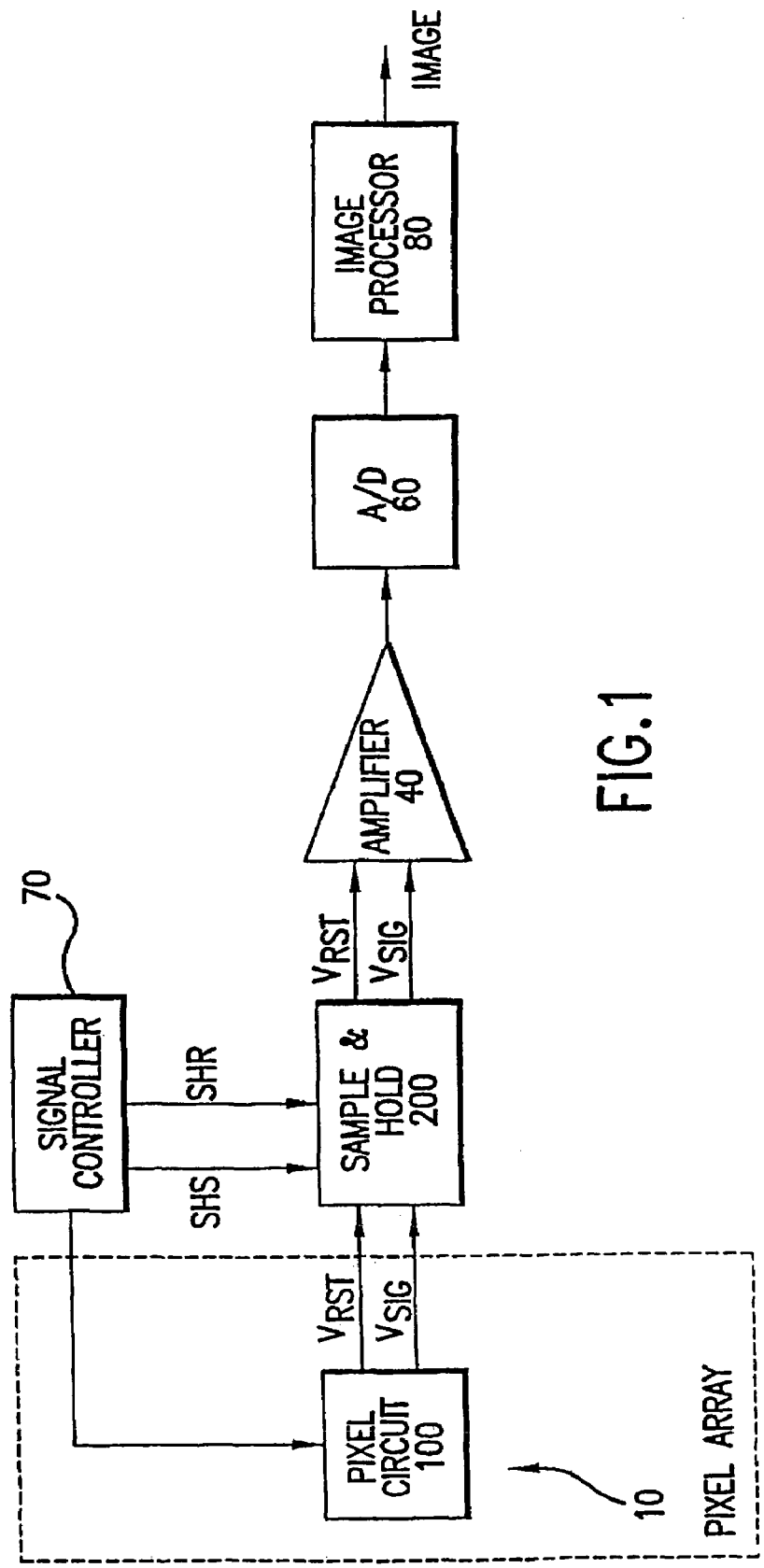
FIG. 1 is a block diagram of an imaging device according to the present disclosure.

The present disclosure is employed in a CMOS imaging device generally illustrated in FIG. 1 by numeral 10. The imaging device includes an array of pixels arranged in rows and columns with each pixel having a pixel circuit 100. The pixel circuit 100 provides a reset signal $V_{RST}$ and a pixel image signal $V_{SIG}$ as outputs during a reset and integration period which are captured by the sample and hold circuit 200 respectively in response to sampling signals SHS (for the image signal) and SHR (for the reset signal). A sample and hold circuit 200 is provided for each column of pixels. Because the pixels are selected in a row by row fashion each pixel column will have a column line to which all pixels of that column are connected. The sample and hold circuit 200 provides the reset signal $V_{RST}$ and image signal $V_{SIG}$ of a pixel circuit 100 to an amplifier 40 which in turn provides a signal representing the difference between the reset signal and pixel image signal ($V_{RST}$–$V_{SIG}$) as an output. This difference signal is provided to an analog to digital converter 60 and from there to an image processor 80 which receives digitized pixel signals from all pixel circuits 100 of the pixel array and provides an image output.

Figure 2:
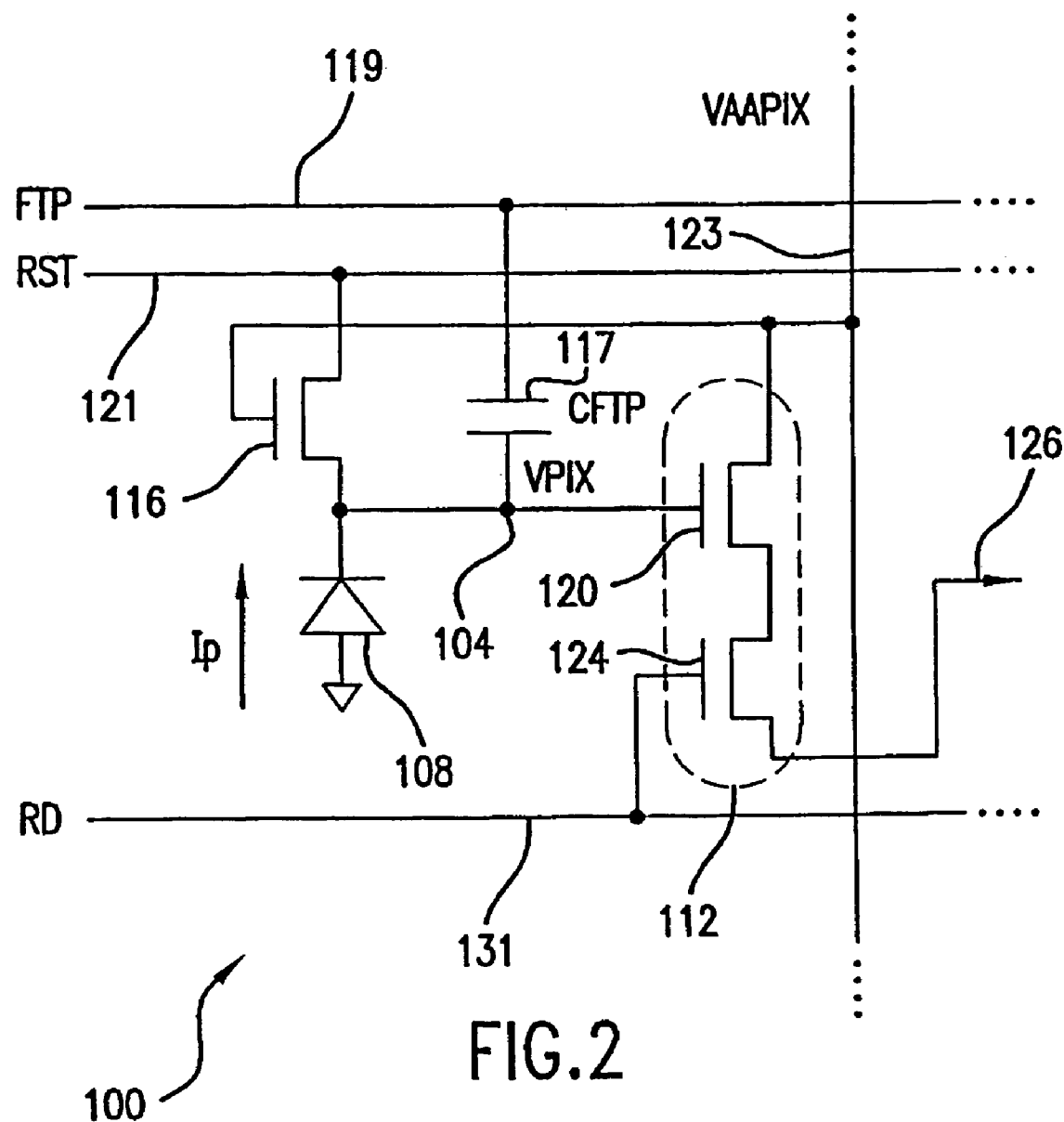
FIG. 2 is a schematic diagram of the active pixel circuit of the present disclosure.

The active pixel circuit 100 in accordance with the present disclosure is shown in more detail in FIG. 2. It includes a conversion transistor 116, an output transistor 120, a row select transistor 124, a photodiode 108, and a feed-through capacitor 117. Also provided are a row select signal line 131 receiving a row select signal RD, a reset signal line 121 receiving a reset signal RST and a feed through pulse line 119 receiving a feed through pulse signal FTP. A voltage supply line 123 is also provided which supplies a voltage VAAPIX to the pixel circuit 100. The conversion transistor 116 has a gate threshold voltage of Vt and is operated either in a shut-off voltage operating mode or a sub-threshold voltage operating mode, as described in greater detail below. The feed through capacitor 117 is located between the horizontal feed through pulse (FTP) signal line 119 and a signal integration node 104. One source/drain region of the transistor 116 is connected to the row reset (RST) signal line 121, while the gate of transistor 116 is connected to the power supply line VAAPIX 123, and the other source/drain region of transistor 116 is connected to integration node 104. The photodiode 108 is connected to the integration node 104 and ground. One source/drain region of an output transistor 120 is connected to the supply line VAAPIX 123 while the gate of transistor 120 is connected to the integration node 104. The gate of row select transistor 124 is connected to the row select signal line which receives the row select signal RD, while the source/drain regions of the transistor 124 are respectively coupled to output transistor 120 and column line 126.

When connected to the column line 126 through the row select transistor 124, the output transistor 120 operates as a source follower transistor and provides a gain to the charge signal received from node 104.

As noted, transistor 116 has two operating modes. One operating mode is a shut-off operating mode in which the transistor 116 imparts a linear output to an accumulated pixel image signal $V_{SIG}$ at node 104 during a charge integration period, while the other operating mode is a sub-threshold operating mode which imparts a logarithmic output to the pixel image signal $V_{SIG}$ accumulated at node 104.

The operation of the pixel circuit 100 will now be explained with reference to the timing diagram of FIG. 3, which shows a typical frame cycle during operation of the pixel circuit 100. At the time t0, the sample and hold signal (SHS) pulse which causes pixel image signal sampling is applied to a sample and hold circuit which causes the pixel image signal (i.e., the accumulated charge) $V_{SIG}$ to be sampled and held. The row select signal RD is also high, signifying that charge accumulated at a node 104 is being read out. This charge was accumulated at node 104 prior to the time t0. At the time t1, the SHS pulse goes low thus completing the sampling of the image signal $V_{SIG}$ voltage level. The value of $V_{SIG}$ appearing at column line 126 may be given by:

$$V_{SIG} = GAIN_{SF} \times (VPIX - Vt(120)) \qquad (1)$$

where $GAIN_{SF}$ is the source follower 112 gain and Vt(120) is the threshold voltage of transistor 120.

At the time t2, the RST line and the feed-through pulse line (FTP) go low. This causes VPIX, the voltage at node 104, to be set to the RST line 121 low voltage which must be less than VAAPIX−Vt(116) (where Vt(116) is the threshold voltage of transistor 116) to inject electrons into the photodiode 108 in advance of the following reset operation. Due to this operation, accumulated signal in the prior frame is completely erased from the node 104.

At time t3, the RST line 121 goes high beginning the process of resetting the pixel. This causes VPIX, the voltage at node 104, to begin increasing toward VAAPIX−Vt(116) and to reach an effective reset level VPIX0, where VPIX0∼VAAPIX−Vt(116).

Figure 3:
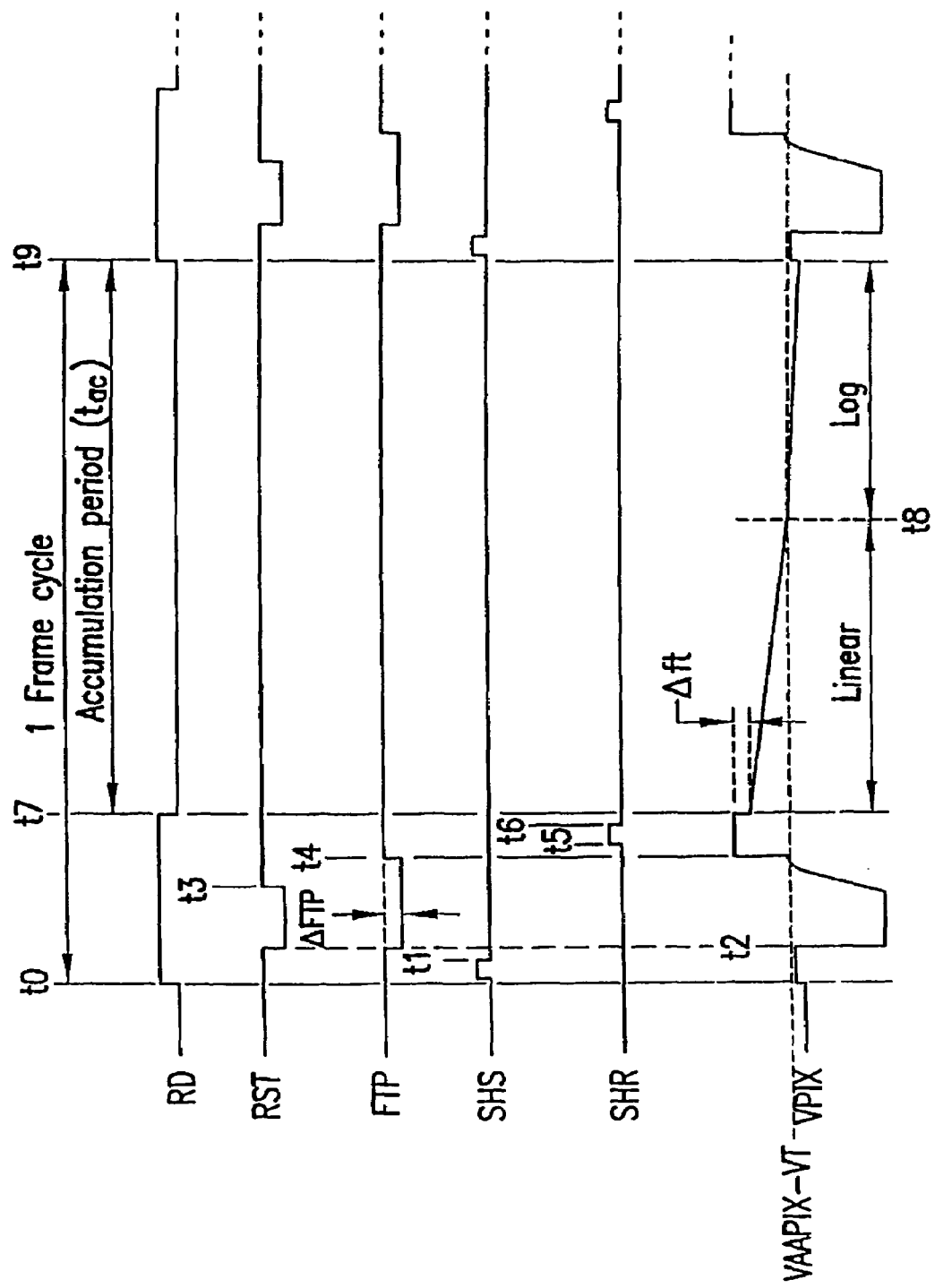
FIG. 3 is a timing diagram depicting operation of the pixel circuit of FIG. 2.

At time t4, the FTP line goes high which causes VPIX to reach the level given by equation (2) below. The value of VPIX increases by static induction through the feed through capacitor CFTP 117.

$$VPIX = VAAPIX - Vt(116) + [(CFTP/CPIX) \times \Delta FTP] \quad (2)$$

where CFTP is the capacitance of the capacitor 117, CPIX is the total capacitance at the node 104, and ΔFTP represents the difference between the high and low state of the FTP line 119 (the pulse height of FTP), as shown in FIG. 3.

At the time t5, the SHR pulse goes high, sampling the reset voltage level by the sample and hold circuit 200. Thus, the reset level of the pixel is read out through the line 126 and sampled synchronizing to the SHR pulse. The pixel circuit reset voltage $V_{RST}$ is produced by the output transistor 120 and is applied through the select transistor 124 to the column line 126. At time t6, the SHR pulse goes low, ending the sampling of the reset voltage VRST. Photo response component (i.e., Vph, as discussed below) can be extracted by subtracting this reset level from the signal level given by equation (1).

At time t7, the RD line goes low ending the first readout process, and beginning a charge accumulation (integration) period. During the period from t7 to t8, the conversion transistor 116 operates in an shut-off mode and a linear accumulated charge signal is processed at the node 104. Initial value of VPIX in the accumulation period (i.e., at t7) is given by equation (2). Then, VPIX decreases by integrating photo-generated charge. At the time t8, the conversion transistor 116 switches to a subthreshold operating mode as the accumulated signal at node 104 forces the transistor 116 into a subthreshold operation region. While VPIX>VAAPIX−Vt(116), VPIX decreases in proportion to the accumulated signal charge. At the point t8, the pixel voltage VPIX at node 104 transitions from a linear to a logarithmic output signal, as described below.

In the linear region of operation, VPIX may be given by:

$$VPIX = VAAPIX - Vt(116) + \frac{CFTP}{CPIX} \Delta FTP - \frac{Qph}{CPIX} \quad (3)$$

where VPIX>VAAPIX−Vt(116), and Qph is the photo-generated charge. To explain more precisely, VPIX may also be represented by the following equation:

$$VPIX = VAAPIX - Vt(116) + (CFTP/CPIX) \times \Delta FTP - \Delta ft \quad (4)$$

In equation (4), the symbol Δft is used, which, as shown in FIG. 3 represents the instantaneous drop in VPIX at time t7 which is caused by a transition of the RD pulse. The effect of Δft is not considered below for the sake of simplicity.

Once VPIX becomes less than VAAPIX−Vt(116), the logarithmic region of operation commences where the transistor 116 turns on and a subthreshold current flows through the transistor 116. Assuming an equilibrium condition between the photo-generated current Iph (or Ip) and the subthreshold current Isth, the following relationship exists.

$$Iph = Isth = I_0 e^{[\beta(VAAPIX - Vt(116) - VPIX)]} \quad (5)$$

where VPIX<VAAPIX−Vt(116), and $I_0$ and β represent coefficients of the subthreshold current Isth of transistor 116.

Thus, VPIX can be represented as:

$$VPIX = VAAPIX - Vt(116) - \frac{1}{\beta} \ln\left[\frac{Iph}{I_0}\right], \quad (6)$$

where $VPIX < VAAPIX - Vt(116)$

At the time t9, the RD and SHS lines go high, the charge accumulation (integration) period ends and the accumulated pixel voltage VPIX (represented by equations (3), (4) or (6)) is read out by the transistors 120, 124 as the pixel image signal $V_{SIG}$, and a new frame cycle begins.

The SHS and SHR pulses correspond to when the signal and reset voltages, respectively, are sampled. As with the control lines FTP, RD, and RST, the SHR and SHS pulses are produced by the signal controller 70 (FIG. 1).

The sampled signal $V_{SIG}$ and reset $V_{RST}$ voltages are then subtracted by amplifier 40 to obtain valid pixel image data (i.e., the photo signal component Vph discussed below). In equation (2) the symbol ΔFTP is used, which, as shown in FIG. 3, symbolizes the difference between the high and low states of the FTP line. The voltage on the FTP line enables the circuit to achieve both linear and logarithmic responses, depending on the level of accumulated charge on the node 104. This is because when signal charge accumulates at the node 104 (FIG. 2) is small, they can all be integrated at the node 104. However, as the amount of signal charge increases to the point where some overflows to the transistor 116 (at time t8 in FIG. 3), the photo response of the entire circuit becomes logarithmic. Thus, the FTP signal line provides a way to achieve linear response under low illumination conditions, yet preserve the circuit's logarithmic capability for higher illumination conditions. As shown in FIG. 3, the crossover between the linear and logarithmic regions occurs at a pixel node 104 voltage of VAAPIX−Vt(116).

During the time the circuit 100 is operating in linear mode (time period t7 through t8), the photo conversion signal PCS or Vph can be expressed as follows. It is noted that the photo signal component Vph is obtained from the difference between the offset (or reset) level and the signal level (given by equation (1) hereinbefore). The photo signal component Vph or PCS may be obtained by the correlated double sampling (CDS) method as is known in the art. It is observed here that the terms "photo response component," "pixel image data", "photo conversion signal", and "photo signal component" are used interchangeably herein to refer to Vph.

$$Vph = PCS = GAIN_{SF} \times (Qph/CPIX) = GAIN_{SF} \times (t_{ac} \times I_{ph}/CPIX) \quad (7)$$

where $GAIN_{SF}$ is the source follower 112 gain, $t_{ac}$ is the integration (accumulation) time as shown in FIG. 3, $I_{ph}$ or Ip (=Qph/$t_{ac}$) is the photo-generated current (or photo current), and CPIX is the total capacitance at the node 104. Also, in equation (7), Vph<[(CFTP/CPIX)×ΔFTP].

However, when the circuit 100 transitions to operating in logarithmic mode (time period t8 through t9), the photo conversion signal PCS can be expressed as follows.

$$Vph = PCS = \qquad (8)$$
$$\text{GAIN}_{SF} \times \left\{ [CFTP/CPIX \times (\Delta FTP)] + \left[ (1/\beta) \times \ln\left(\frac{I_{ph}}{I_0}\right) \right] \right\}$$

where Vph>[(CFTP/CPIX)×ΔFTP], CFTP is the capacitance of the capacitor 117, and the symbol β represents an exponential coefficient of the subthreshold current of the transistor 116. Assuming that photodiode current Iph remains constant throughout the accumulation period (i.e., Iph=Qph/$t_{ac}$), equation (8) can be rewritten as, $$Vph = \qquad (9)$$
$$\text{GAIN}_{SF} \times \left\{ [CFTP/CPIX \times (\Delta FTP)] + \left[ (1/\beta) \times \ln\left(\frac{Q_{ph}}{I_0 t_{ac}}\right) \right] \right\}$$

Variations in threshold voltage Vt are one of the most well known causes of instability in MOS transistors. However, variations in the threshold voltage Vt do not affect photoconversion characteristics of the circuit 100 because there is no component relating to the threshold voltage in both of the equations (7) and (9) above. Because threshold voltage changes within the conversion transistor 116 cause the same level shift for both the reset and the transition levels expressed by the equations (2) and (4) above, Vt(116) does not contribute to the range of linear operation of VPIX. Additionally, by subtracting $V_{RST}$ from $V_{SIG}$, variations in Vt(120) are also suppressed. Consequently, Vt components are not contained in the output 126 of the circuit 100. It is also noted that the depth of the linear region expressed by equation (7) can be determined by the pulse height of FTP (i.e., ΔFTP), pixel capacitor CPIX, and feed through capacitor CFTP.

Meanwhile, the conversion gain in both the linear and logarithmic operating regions are determined by the feed through capacitor CFTP, pixel overall capacitance CPIX, and β, as shown in the equation (9) above. Fortunately, variations in these parameters are much smaller than the threshold voltage Vt. Thus, improved uniformity and stability of the circuit 100 is achieved, and problems with fixed pattern noise (FPN) are reduced.

In equation (9) above, the total capacitance of the pixel node 104 is represented as CPIX. CPIX consists, of course, of CFTP but also includes the capacitance of the photodiode 108 and the sum of parasitic capacitances of the circuit 100 such as the gate capacitance of the transistor 120, and the junction capacitance of the source node of the transistor 116. Prior to a reset operation, a substantial amount of charge is injected into the pixel capacitor CFTP and its potential is then pinned at the 'low' level of the RST line as shown between the time period t2-t3 of FIG. 3. Because of this pinning action, the primary integrated signal is fully discharged from CPIX, so that the reset operation completely resets the circuit 100, and excess charge from previous imaging cycles of the circuit 100 does not 'lag' into the following imaging cycles.

While the transistor 116 is operating in sub-threshold mode during the time period t8-t9, any excess charge (overflow) present on the pixel node 104 is drained through the transistor 116. Another contribution to more effective resetting of the circuit 100 is that, during the reset time period t2-t3, the current through the transistor 116 is much larger than the photocurrent $I_p$. Therefore, temporal photocurrent during the reset time period does not affect the reset operation, so that a stable reset level for the photodiode 108 can be obtained for the subsequent accumulation period, which thereby reduces image lag.

Figure 4:
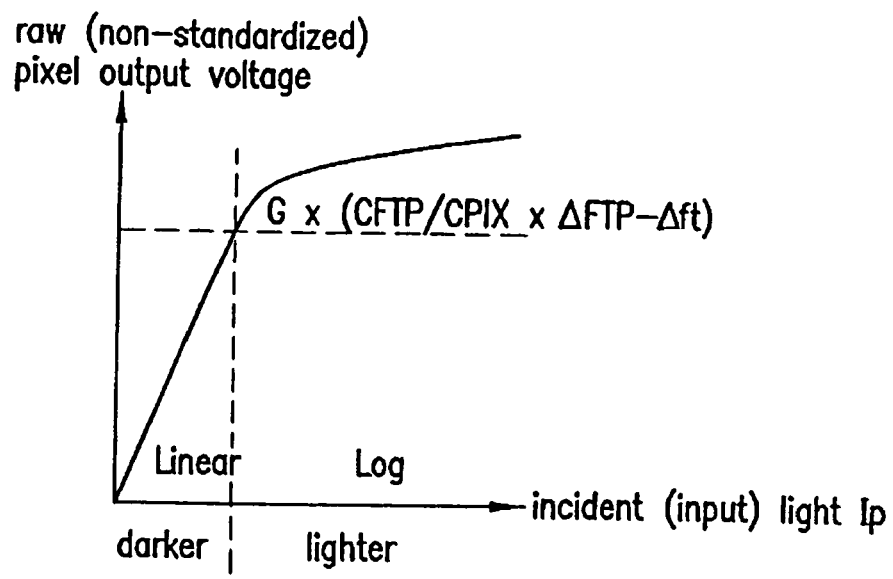
FIG. 4 is a graph of the raw linear and logarithmic response regions of the FIG. 2 active pixel circuit.
Figure 5:
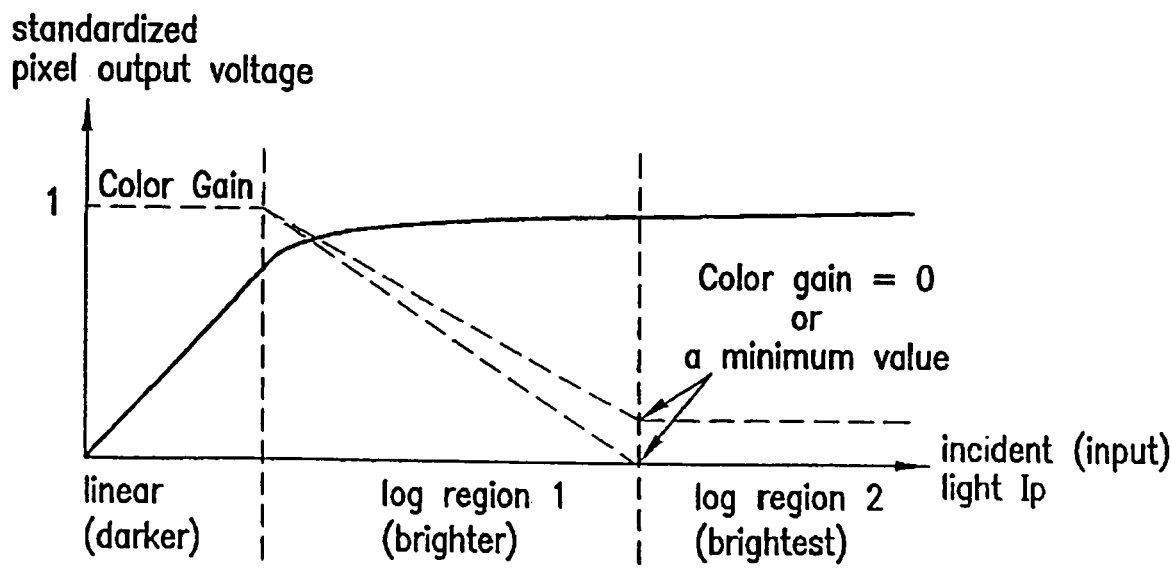
FIG. 5 is a graph of the standardized linear and logarithmic response regions of the FIG. 2 active pixel circuit.

When incoming light detected by the photodiode 108 is exceptionally strong, the accumulated (integrated) charge on the capacitor CFTP becomes large. However, any excess signal component (excess charge) becomes compressed because the circuit 100 begins operating in a logarithmic mode. In this way, the circuit 100 can achieve a higher dynamic range more closely resembling the image sensing properties of the human eye. However, special color processing functions (standardization) are still needed for situations where exceptionally bright light is incoming onto the photodiode 108. FIG. 4 shows the raw, non-standardized pixel output voltage of the circuit 100 without any processing by the image processor 80. FIG. 5 shows the standardized pixel output voltage of the circuit 100 after processing by the image processor 80.

When the circuit 100 is operating in the linear mode (FIGS. 3-5), the color enhancement gain Gc is at unity, i.e. equal to 1. When the circuit 100 is operating in the logarithmic mode, the output range is divided into regions 1 and 2, as shown in FIG. 5, where the dividing line between the two regions is an arbitrary, predetermined amount of incident light on the photodiode 108. FIG. 5 shows that a pixel's color may be shifted to white or to some other color by the image processor 80 (FIG. 1), depending on the brightness level of that signal. In region 1 of FIG. 5, the color enhancement gain Gc ranges between 0 and 1 and is not affected by the image processor 80. However, when a pixel signal is within the logarithmic region 2, the color signal is either eliminated (Gc=0) or set to a predetermined minimum value (Gc=Gcmin) by the image processor 80.

Figure 6:
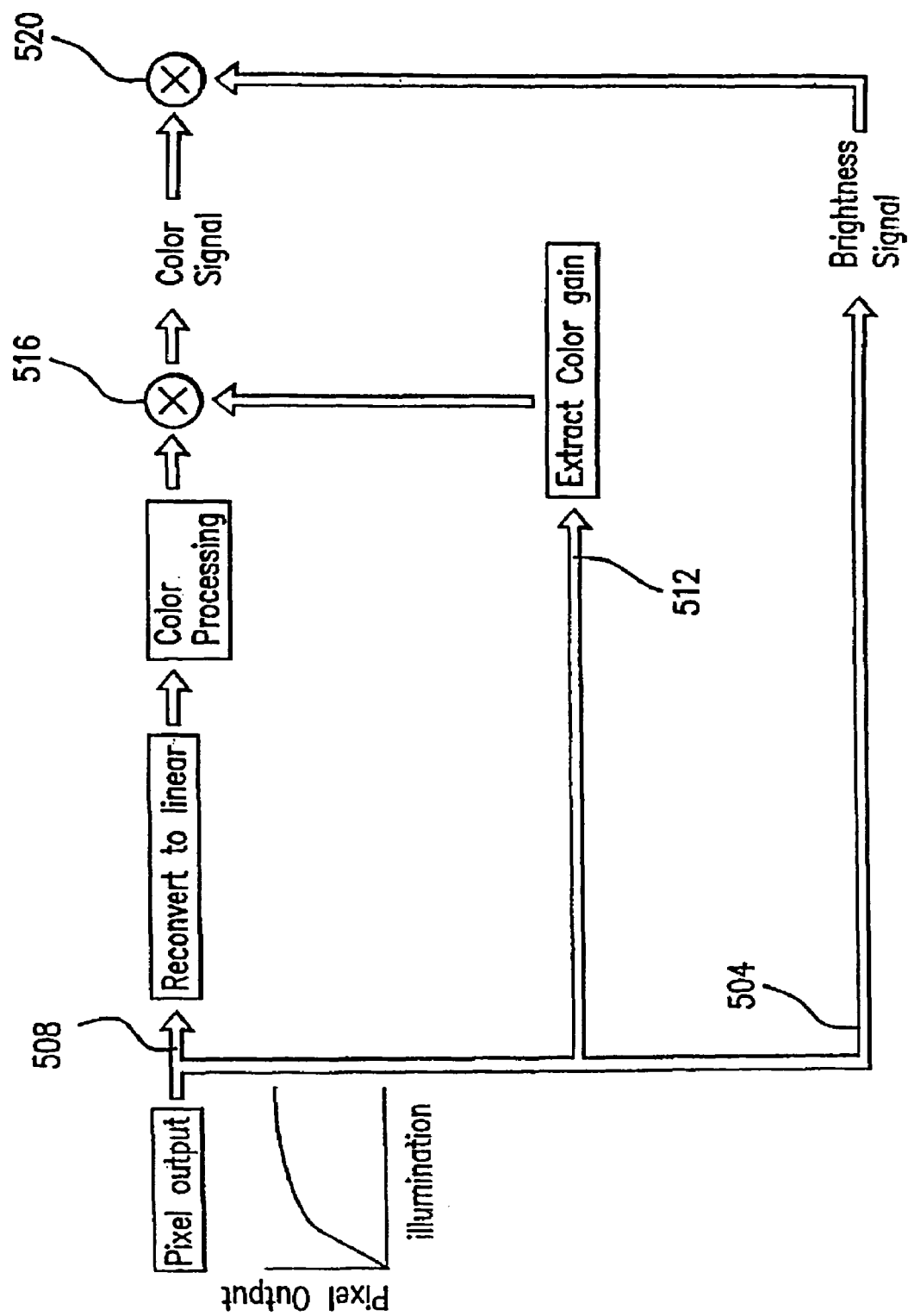
FIG. 6 is a flowchart depicting the process of separating, processing, and recombining the color and brightness signals outputted from the pixel circuit of FIG. 2.

FIG. 6 details the standardization process employed by the image processor 80 (FIG. 1) in breaking down logarithmic pixel signals into separate color and brightness components. The digitized pixel output originating from the analog to digital converter 60 is divided into three separate signal branches 504, 508, and 512 by the image processor 80. Branch 504 is for brightness signal extraction, branch 508 is for color signal extraction, and branch 512 is for color gain extraction. In the branch 508, the pixel output is reconverted from a logarithmic to a linear response, then transferred to a color processing circuit to extract its color component. In branch 512, a color gain factor is calculated from the pixel output level as shown in FIG. 5. The color component is then multiplied by the factor of the color gain at processing step 516. From both the gained color signal and brightness signal obtained in the processing branch 504, a final color video signal is constructed at the processing step 520. The brightness component extracted in processing branch 504 requires no additional processing (thus remains "raw"), but it is necessary to process (standardize) the color component 508, 512 prior to applying the gain at processing step 516. Because the photo signal is compressed logarithmically in the pixel output, calculation error increases in reconverting data to the linear response with increasing brightness, which unfortunately increases color noise in high illumination portions of the images. However, by decreasing color gain in the high illumination conditions at the processing step 516, the color noise can be suppressed thereby yielding a more natural looking low-noise color image.

Figure 7:
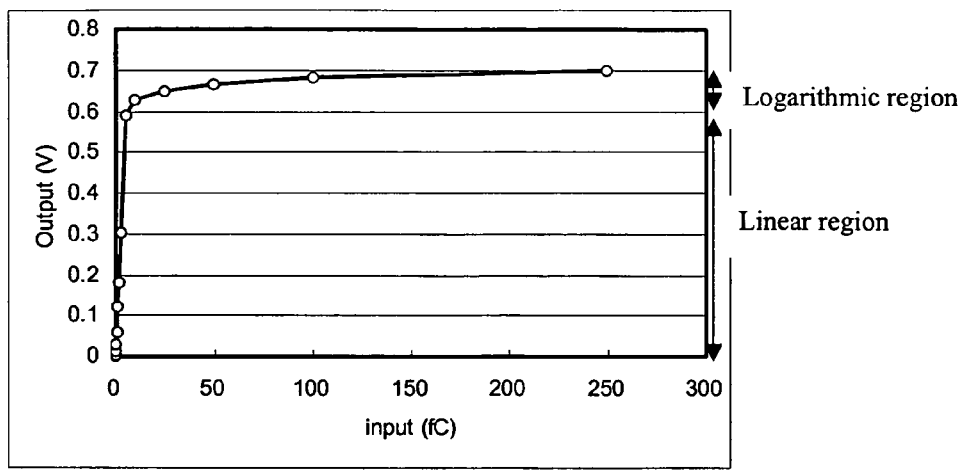
FIG. 7 shows a simulated photo conversion characteristics for the pixel circuit of FIG. 2.
Figure 8:
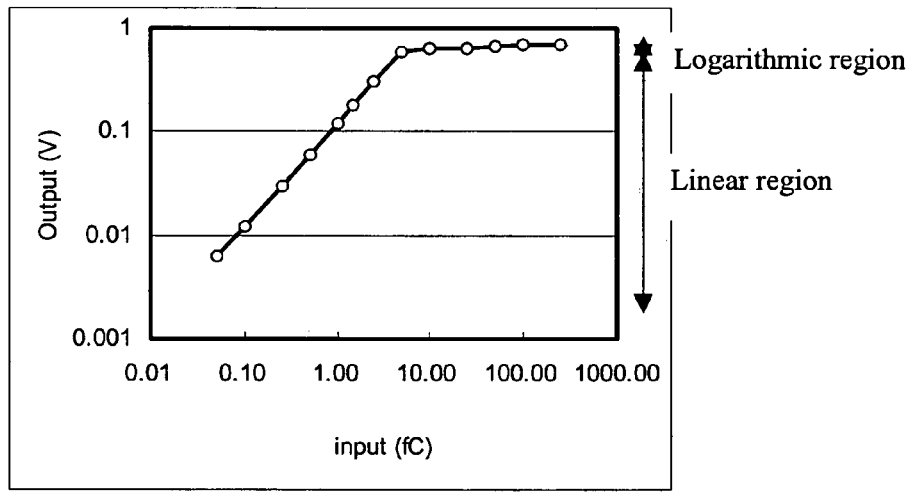
FIG. 8 illustrates the plot of FIG. 7 with a logarithmic scale for both X and Y axes.
Figure 9:
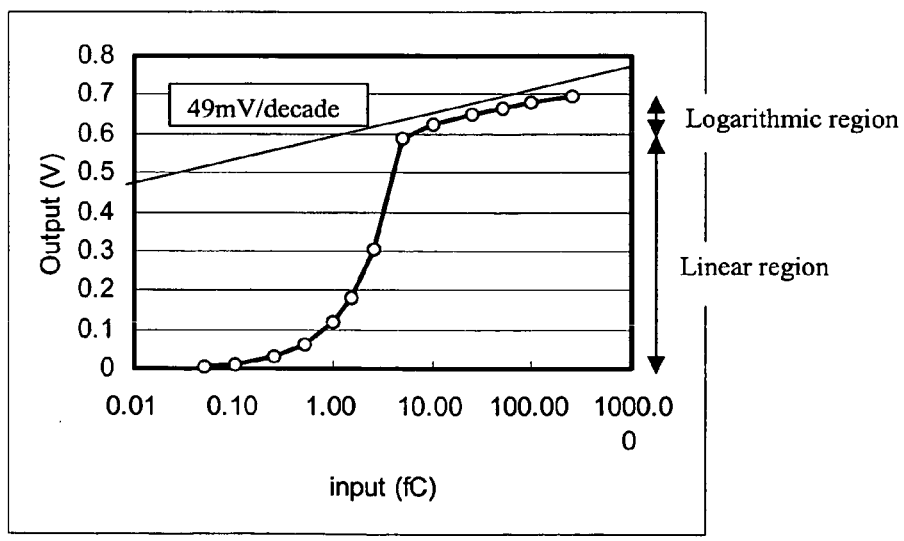
FIG. 9 depicts the plot of FIG. 7 with linear scaled output versus logarithmically scaled input.

As described hereinbefore, the linear-logarithmic (L-L) pixel imager (e.g., the pixel circuit 100) according to the present disclosure has a wide dynamic range. It is noted that the terms "pixel imager" and "pixel circuit" are used interchangeably in the discussion given herein to refer to corresponding pixel circuits (e.g., the pixel circuit or imager 100 in FIG. 2, the pixel circuit or imager 600 in FIG. 10, etc.) Wide intra-scene dynamic range has been demanded in many imaging applications such as digital still cameras, security systems, automotive applications, etc. FIGS. 7-9 illustrate examples of the simulation results of a SPICE simulation performed on the pixel imager 100. FIG. 7 shows a simulated photo conversion characteristics for the pixel imager 100 of FIG. 2; FIG. 8 illustrates the plot of FIG. 7 with a logarithmic scale for both X and Y axes; and FIG. 9 depicts the plot of FIG. 7 with linear scaled output versus logarithmically scaled input. It is noted here that the output voltage on Y-axis in FIGS. 7-9 is the photo signal (Vph) obtained using correlated double sampling (CDS). On the other hand, the input charge (Qph) on the X-axis in FIGS. 7-9 is measured in fC (femto coulomb). As per the discussion hereinbefore, it is observed that Qph is proportional to Iph. Therefore, the plots in FIGS. 7-9 represent photoconversion characteristics (Vph vs. Iph) of the L-L pixel imager 100. In the simulation, the signal charge (Qph) is given by a simulated current source connected to the VPIX terminal (i.e., node 104) in FIG. 2.

In FIG. 7 both of input axis (X-axis) and output axis (Y-axis) are linearly scaled. An input charge should be considered as a photo signal charge. It is seen from FIG. 7, that although photoconversion characteristics of imager 100 are not illustrated in detail in FIG. 7, the photo conversion characteristics in the liner conversion region and in the logarithmic conversion region can be grasped easily. To make the input/output relationship more clearly visible, both axes are scaled logarithmically in FIG. 8. It is seen from FIG. 8 that under lower input charge, a linear photo conversion response is confirmed to have a slope of 1. This means the photo signal charge is integrating in the photodiode capacitor (not shown in FIG. 2) without overflowing. In higher input charge situation (the logarithmic region), the output signal (on Y-axis) increases gradually as the input charge increases. In this logarithmic region, excess photo current is overflowing from the photodiode 108 through the conversion transistor 116. FIG. 9, on the other hand, illustrates a problem of the L-L pixel imager 100. In FIG. 9, the output (on Y-axis) is liner scaled whereas the input (on X-axis) is logarithmically scaled. In the higher input region in FIG. 9, the excess input charge is flowing out through the transistor 116. It is noted that the value of the slope of the plot in the logarithmic region in FIG. 9 is 49 mV/decade.

As is expected in equation (5), the overflowing current is equal to the subthreshold current (Isth) of the conversion transistor 116. Therefore, equation (5) can be rewritten as follows.

$$Iph = Isth = I_0 * 10^{\frac{[VAAPIX - Vt(116) - VPIX]}{\alpha}} \quad (10)$$

Where "α" is the subthreshold coefficient defined as follows.

$$\alpha = \frac{\ln 10}{\beta} \quad (11)$$

where "β" is as used in equation (5). Using a standard SPICE model parameter, the subthreshold coefficient "α" of transistor 116 with body effect is α=58 mV/decade, and the gain of the source follower circuit 112 ($GAIN_{SF}$) is 0.84. Thus, the slope value of the charge conversion characteristics in the logarithmic region in FIG. 9 can be calculated as follows.

$$58 \text{ mV/decade} \times 0.84 = 49 \text{ mV/decade} \quad (12)$$

Accordingly, it is observed that the slope of the photo conversion characteristics in the logarithmic region may depend on the subthreshold coefficient "α" of the transistor 116.

From a practical point of view, in FIGS. 7-9, the output swing in the linear region may be considered sufficiently wide. But, the output swing in the logarithmic region may be considered narrow. The narrow voltage swing may degrade the final picture quality. Therefore, it is desirable to improve the output signal voltage swing in the logarithmic region so that the output voltage swing is wider in that region. To widen the voltage swing in the logarithmic region, it may be desirable to enlarge the subthreshold coefficient "α" by several times. It is known that thick gate oxide or deep channel MOS structure has a large subthreshold current coefficient. Therefore, one way to increase the value of "α" is to perform complicated semiconductor fabrication process during fabrication of the MOS transistor 116. However, in the embodiments discussed hereinbelow with reference to FIGS. 10, 13, and 15, a methodology is described wherein the value of "α" of transistor 116 is enlarged without resorting to any complicated semiconductor fabrication.

Figure 10:
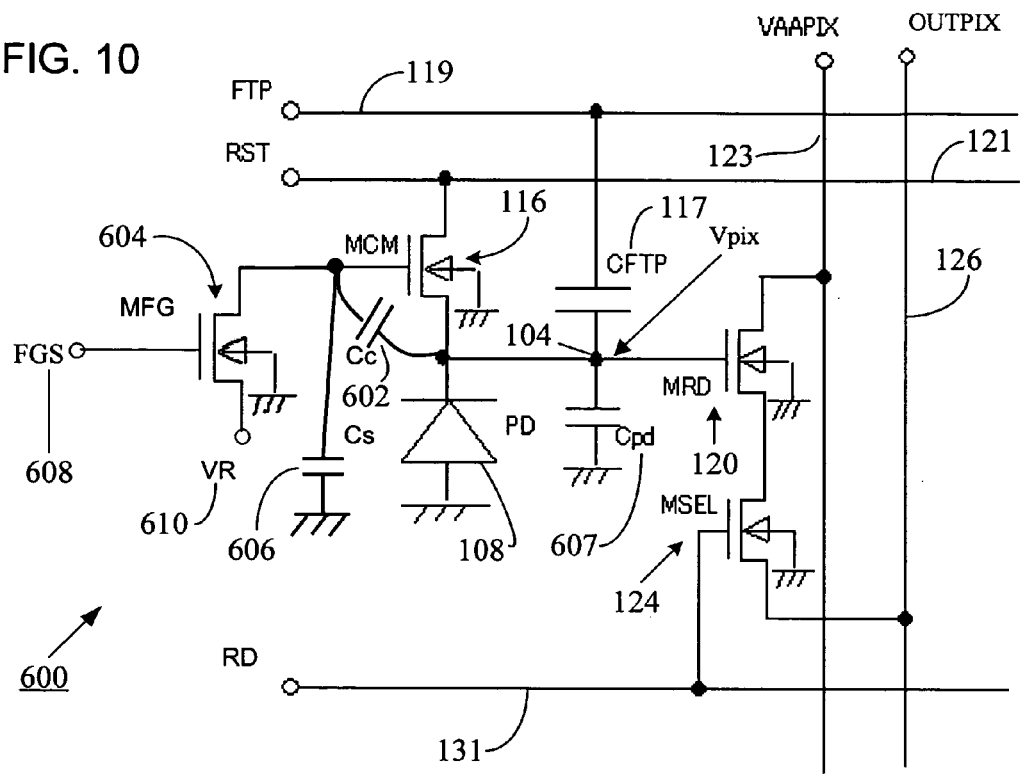
FIG. 10 shows the L-L pixel circuit of FIG. 2 with a gain control circuit added thereto.

FIG. 10 shows the L-L pixel imager of FIG. 2 with a gain control circuit added thereto. The L-L pixel imager 600 in FIG. 10 is similar to the imager 100 in FIG. 2, except that some additional circuit components are present in FIG. 10 as discussed below. It is noted here that for the sake of simplicity and ease of discussion, the circuit components and signal lines common between FIGS. 2 and 10 are designated by the same reference numeral in both of the figures. To improve the subthreshold current coefficient of the conversion transistor MCM (116), a switching transistor MFG (604) is connected between the gate of MCM transistor and an external voltage supply $V_R$ 610 as shown in FIG. 10. The inserted transistor 604 makes the MCM transistor 116 operate in a floating gate state as discussed in more detail hereinbelow. Furthermore, a coupling capacitor Cc (602) is connected between the source and gate of MCM transistor 116. As the voltage change of the source of the MCM transistor can change the gate voltage of the MCM transistor, the subthreshold current coefficient "α" of the MCM transistor 116 can be increased effectively. By enlarging the subthreshold current coefficient of MCM transistor 116, a signal voltage swing in the logarithmic region of operation can be made large as discussed hereinbelow with reference to FIG. 12. Thus, the L-L pixel imager 600 in FIG. 10 improves upon the L-L pixel imager 100 in FIG. 2 to obtain large signal voltage swings both in the linear region and in the logarithmic region.

In FIG. 10, the capacitor Cs 606 represents the stray capacitance, which is composed of the gate-drain capacitance of MCM transistor 116, the gate-source capacitance of MFG transistor 604, and so on. It is observed here that the stray capacitance may be realized by physically connecting a capacitor (e.g., the capacitor Cs 606 in FIG. 10) at the gate of transistor 116 or, alternatively, the stray capacitance may be taken into account (in determining the effective subthreshold current coefficient "α" of transistor 116) without physically fabricating the capacitor Cs 606. Similarly, in one embodiment, the coupling capacitor Cc 602 may be realized by the gate-source capacitance of MCM transistor 116, without physically connecting a separate capacitor (e.g., the capacitor Cc 602 in FIG. 10) between the gate and source terminals of the transistor 116. In any event, the choice of how to realize these capacitances depends on the design considerations. For example, during circuit design, if an acceptable ratio of (Cc+Cs)/Cs (as discussed below) is obtained, then any combination of capacitors Cc and Cs (whether physically fabricated or inherently realized through appropriate fabrication of transistors and other circuit elements) may be availed of. Further, in FIG. 10, a capacitor Cpd 607 is also shown connected between node 104 and ground, representing the capacitance of the photodiode 108. Thus, the additional gain control circuit in FIG. 10 may at least include the coupling capacitor Cc 602 and the switching transistor MFG 604. In one embodiment, the stray capacitance Cs 606 may also be considered part of the gain control circuit added to the L-L pixel imager 100 in FIG. 2 to obtain the imager configuration shown in FIG. 10. In operation, because the voltage change at the source of the MCM transistor 116 changes the gate voltage of the MCM transistor through the coupling capacitance of Cc 602, the effective subthreshold current coefficient "α" of the MCM transistor 116 can be increased by the factor of (Cc+Cs)/Cs. As noted before, by enlarging the subthreshold current coefficient of MCM transistor 116, the signal voltage swing in the logarithmic operation can also be made large as discussed below with reference to FIG. 12.

Figure 11:
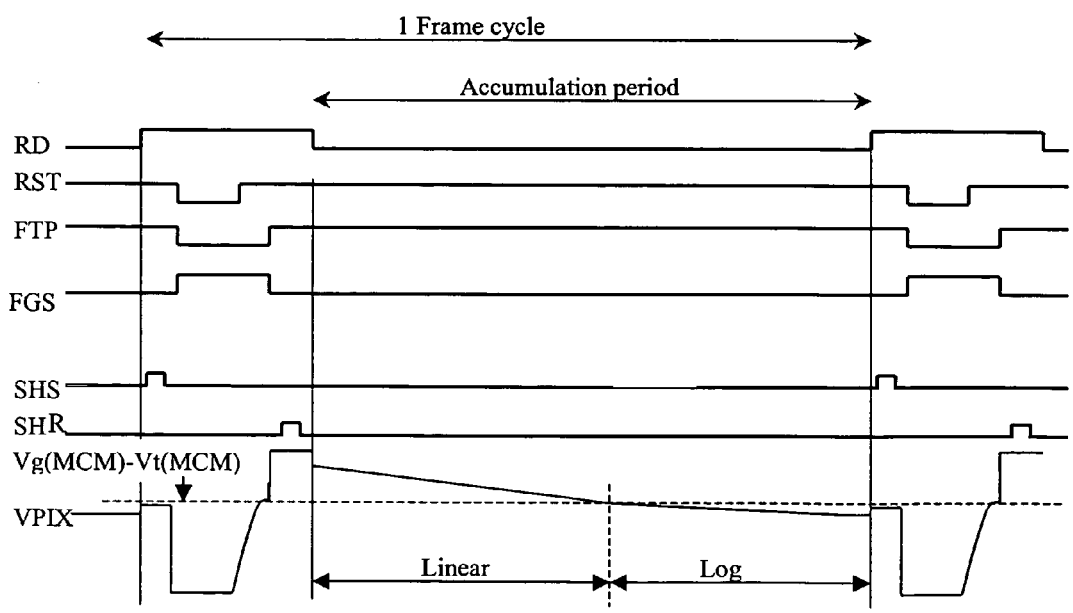
FIG. 11 is a timing diagram depicting the operation of the pixel circuit of FIG. 10.

FIG. 11 is a timing diagram depicting the operation of the pixel imager 600 of FIG. 10. It is observed here that the pulse-timing diagram in FIG. 11 is similar to that shown in FIG. 3 and, hence, only a brief discussion of the pixel imager operation depicted in FIG. 11 is provided herein. As in FIG. 3 (and as also shown in FIG. 11), at first, the RD pulse (on the RD line 131) is applied to MSEL 124 to select the pixel. With this pulse RD, voltage signal is generated at node OUTPIX 126 and is given by [$GAIN_{SF}$*(VPIX−Vt(MRD))], assuming that a load resistor is connected to the OUTPIX line 126. Here, Vt(MRD) is the threshold voltage of the transistor 120, and $GAIN_{SF}$ is the voltage gain of the source follower circuit which includes the transistors 120 and 124 (same as the source follower circuit 112 in FIG. 2).

When an FGS pulse is applied (at the FGS node or terminal 608 in FIG. 10) to a high level voltage, the MFG transistor 604 is turned ON. Thus, the voltage $V_R$ (at node $V_R$ 610) is applied to the gate of the MCM transistor 116. Applying an 'L' pulse (a "low" or logic value "0" pulse) on both the RST (121) and the FTP (119) lines, the level of VPIX at node 104 is set at the 'L' level of RST, which must be less than [$V_R$−Vt(MCM)] to inject electrons into the photodiode 108 in advance of the following reset operation, where Vt(MCM) (or Vt(116)) is the threshold voltage of the MCM transistor 116. Due to this operation, accumulated signal in the prior frame is completely erased from the node 104.

Thereafter, the pulse RST is set at 'H' (a "high" or logic "1" level), so that VPIX increases and reaches to an effective reset level VPIX0.

$$VPIX \sim V_R - Vt(116) \quad (13)$$

When the voltage of FGS (at node 608) is set at 'L', the gate of MCM transistor 116 is held in a floating condition. After that, the FTP pulse turns ON (or goes "high"), so that VPIX is increased by static induction through the feed through capacitor CFTP 117 as expressed by:

$$VPIX = VPIX0 + \frac{CFTP}{CPIX}\Delta FTP \quad (14)$$

$$= Vg(116) - Vt(116) + \frac{CFTP}{CPIX}\Delta FTP \quad (15)$$

where, CPIX is the total capacitance of the pixel detection node 104, ΔFTP is the pulse height of FTP signal and Vg(MCM) or Vg(116) is the gate voltage of MCM transistor 116.

Reset level of the pixel is then readout through the node OUTPIX 126 and sampled synchronizing to SHR pulse. Photo response component (Vph) can then be extracted by subtracting this reset level from the signal level given by equation (1) and also described hereinabove with reference to FIG. 11.

The pixel charge accumulation then starts by placing the RD pulse on the 'L' level (logic "0" or "low" level). Initial condition of VPIX in the accumulation period is given by equation (15). Then VPIX decreases by integrating photo-generated charge as discussed hereinbefore with reference to FIG. 11. While VPIX>Vg(116)−Vt(116), the decrease in VPIX is in proportion to the accumulated signal charge. The value of VPIX in the linear region may be given by:

$$VPIX = Vg(116) - Vt(116) + \frac{CFTP}{CPIX}\Delta FTP - \frac{Qph}{CPIX} \quad (VPIX > Vg(116) - Vt(116)) \quad (16)$$

Once VPIX becomes less than Vg(116)−Vt(116), the transistor MCM 116 turns on and a subthreshold current flows through the MCM transistor 116. Assuming an equilibrium condition between the photo generated current Iph and the subthreshold current Isth, the relationship between these two currents is as follows.

$$Iph = Isth = I_o \exp[\beta(Vg(116) - Vt(116) - VPIX)]$$
$$(VPIX < Vg(116) - Vt(116)) \quad (17)$$

As the voltage of FGS is set at level 'L' (logic "0" or "low" level), the gate of MCM transistor 116 is kept in a floating condition. When VPIX changes by ΔVPIX, Vg(MCM) (i.e., Vg(116)) changes by [(Cc/(Cc+Cs))ΔVpix]. Accordingly, the voltage difference between the gate and source of the MCM transistor 116 is expressed as follows.

$$\Delta(Vg - VPIX) = \left(\frac{Cc}{Cc + Cs}\Delta VPIX\right) - \Delta VPIX \quad (18)$$

$$= -\frac{Cs}{Cc + Cs}\Delta VPIX$$

Thus, using the gain control circuit mechanism, the effective subthreshold current coefficient "α" can be made large by the factor of (Cc+Cs)/Cs. Further, equation (17) can be re-written as follows.

$$VPIX = \quad (19)$$
$$Vg(116) - Vt(116) - \frac{1}{\beta}\ln\left[\frac{I_{ph}}{I_0}\right] (VPIX < Vg(116) - Vt(116))$$

After the charge accumulation period, the VPIX expressed by equations (16) or (19) is readout by applying the RD pulse (i.e., a "high" or logic "1" value for the RD pulse). The photo signal component Vph is then obtained from the difference between the offset level and signal level as given below.

In linear region, $Vph = Qph/CPIX$, $\left(Vph < \dfrac{CFTP}{CPIX}\Delta FTP\right)$ (20)

In logarithmic region, $Vph = \dfrac{1}{\beta}\ln\left[\dfrac{Iph}{I_0}\right] + \dfrac{CFTP}{CPIX}\Delta FTP$, (21)

$\left(Vph > \dfrac{CFTP}{CPIX}\Delta FTP\right)$

Assuming that photo current Iph is constant through the accumulation period, $Iph=Qph/t_{ac}$, where $t_{ac}$ is the duration of the accumulation period. Therefore, equation (21) can be rewritten as, $Vph = \dfrac{1}{\beta}\ln\left[\dfrac{Qph}{I_0 \times tac}\right] + \dfrac{CFTP}{CPIX}\Delta FTP$, $\left(Vph > \dfrac{CFTP}{CPIX}\Delta FTP\right)$ (22)

It is noted here that the depth of the linear region expressed by equation (20) can be determined by the pulse height of FTP, pixel capacitor CPIX and feed through capacitor CFTP.

Figure 12:
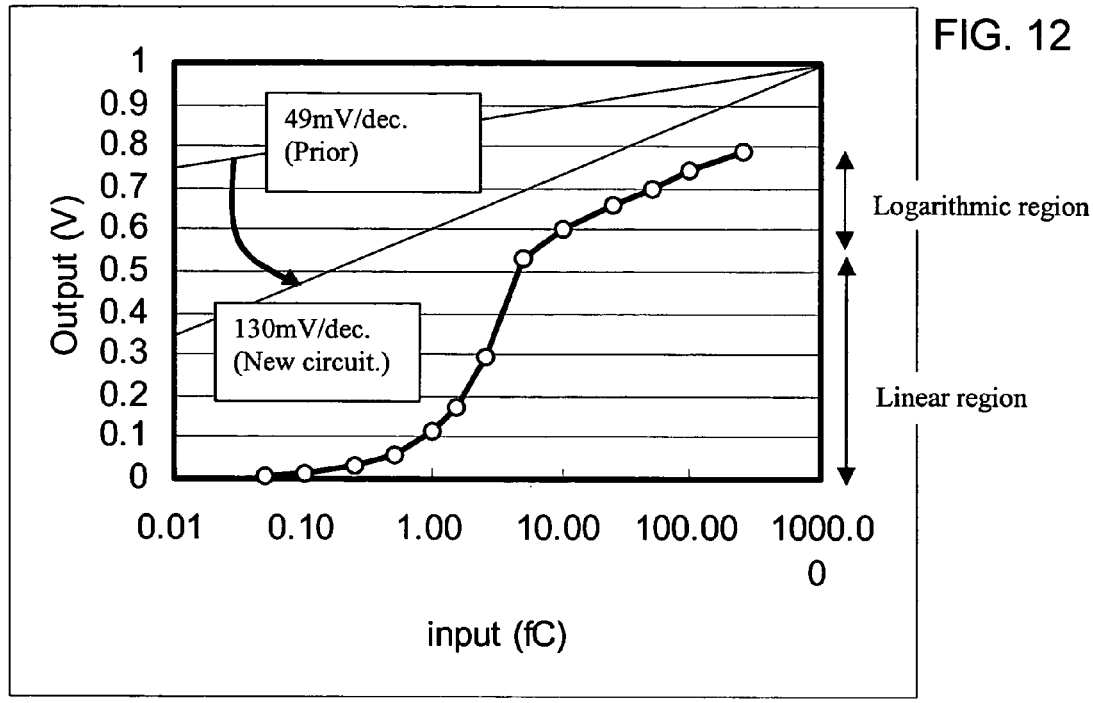
FIG. 12 is a simulated photo conversion characteristics for the pixel circuit of FIG. 10.

FIG. 12 is a simulated photo conversion characteristics for the pixel imager 600 of FIG. 10. The SPICE simulated results for the circuit of FIG. 10 include the coupling capacitor, Cc of 1 fF (femto farad) and the stray capacitance, Cs of 0.6 fF. The X-axis in FIG. 12 is logarithmically-scaled, whereas the Y-axis is linearly-scaled. It is seen from a comparison of the input/output plots in FIG. 12 and FIG. 9 that the output voltage swing in the plot in FIG. 12 is enlarged by the factor of (Cs+Cc)/Cs as predicted in equation (18). In FIG. 12, the slope of the plot in the logarithmic region is 130 mV/decade, which is significantly higher than the 49 mV/decade slope illustrated in FIG. 9 for the L-L pixel imager 100 of FIG. 2. It is observed that, in FIG. 12, the output swing in the linear region is not affected. Thus, the use of the gain control circuit in the L-L pixel imager 600 of FIG. 10 results in large photo signal voltage swings in both the linear as well as the logarithmic regions of operation. The gain control circuit (including at least the transistor 604 and the capacitor Cc 602) does not affect the signal voltage swing in the linear region of operation, but significantly widens the voltage swing in the logarithmic region as is seen from the plot in FIG. 12.

Figure 13:
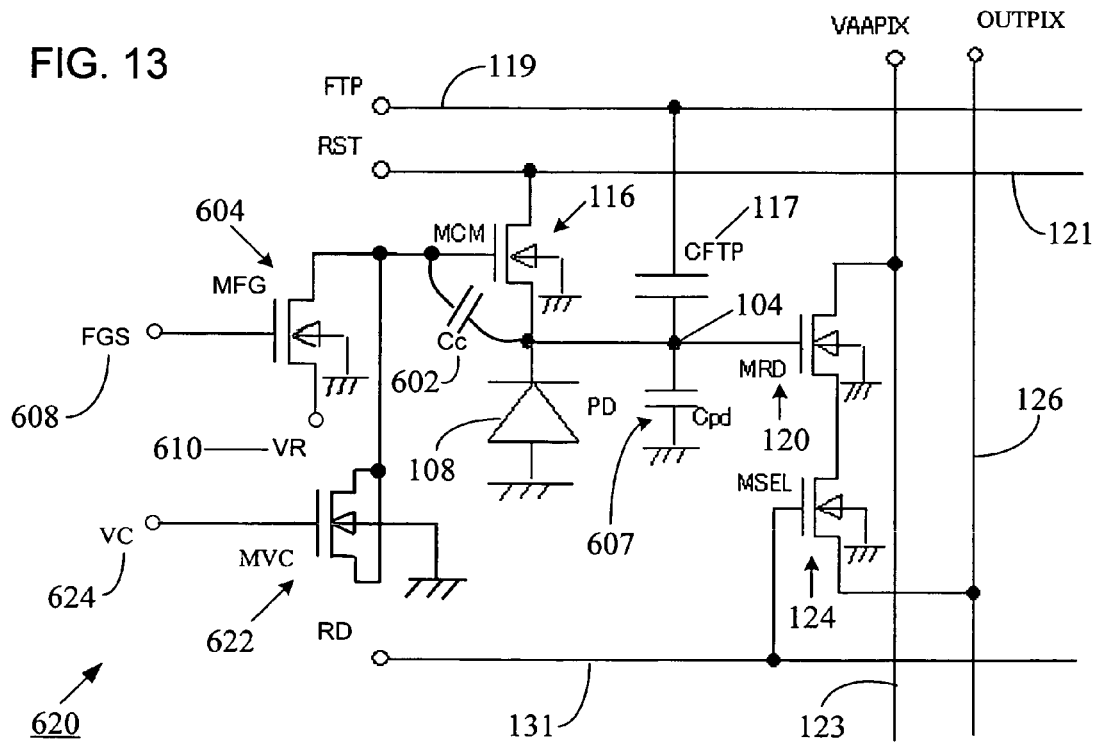
FIG. 13 depicts another embodiment of an L-L pixel imager according to the present disclosure.
Figure 14:
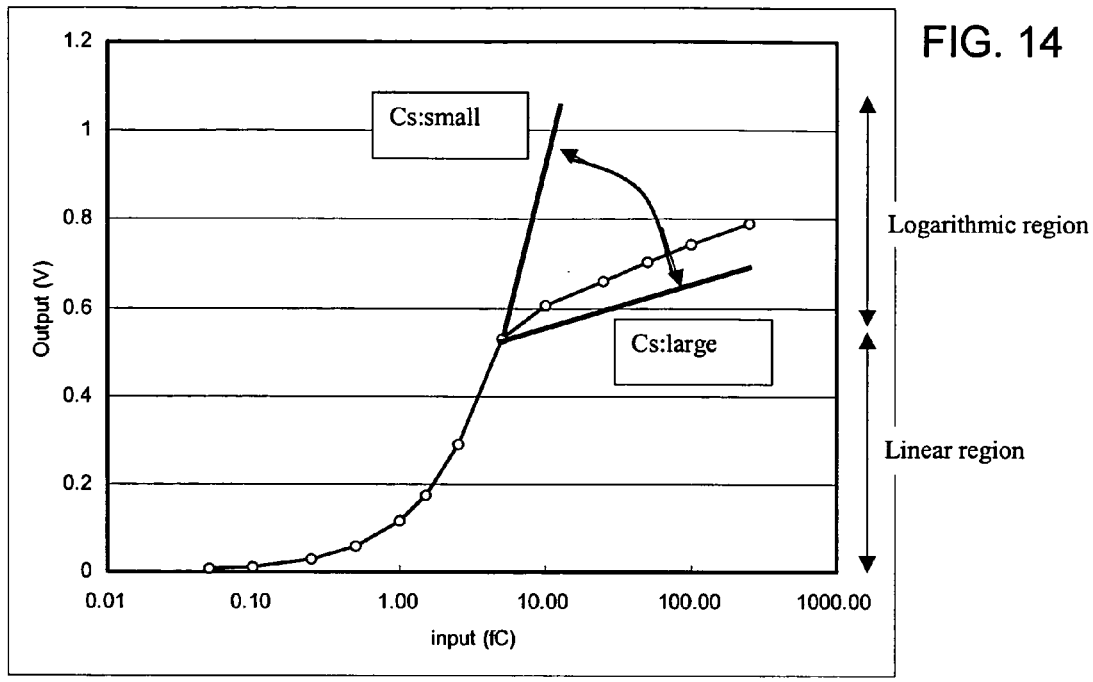
FIG. 14 illustrates a photo conversion characteristics for the pixel imager of FIG. 13.

FIG. 13 depicts another embodiment of an L-L pixel imager 620 according to the present disclosure. As before, circuit elements or signal lines common between the imagers shown in FIGS. 2, 10, and 13 are designed by identical reference numerals. As explained hereinbefore with reference to the discussion of the embodiment of FIG. 10, the subthreshold current coefficient "α" is determined by the coupling capacitor, Cc (602) and the stray capacitance, Cs (606). In the L-L pixel imager 620 of FIG. 13, a MOS capacitor, MVC (622) is connected to the gate of MCM transistor 116. The MOS capacitor MVC 622 in FIG. 13 acts as the stray capacitor Cs 606 in FIG. 10. However, a difference between the embodiments in FIGS. 10 and 13 is that the MOS capacitor 622 in FIG. 13 can be controlled by applying appropriate voltage Vc (624) at its gate terminal, whereas the capacitor Cs 606 in FIG. 10 is not externally controlled. FIG. 14 illustrates a photo conversion characteristics for the pixel imager 620 of FIG. 13. The plot in FIG. 14 shows how the photo signal conversion characteristics of the imager 620 changes with changing Cs. As mentioned here, changes in the values of Cs are obtained using the MOS capacitor 622. Accordingly, the photo signal voltage swing can be controlled by applying appropriate external gate voltage Vc (624) to the gate of MVC 622.

Figure 15:
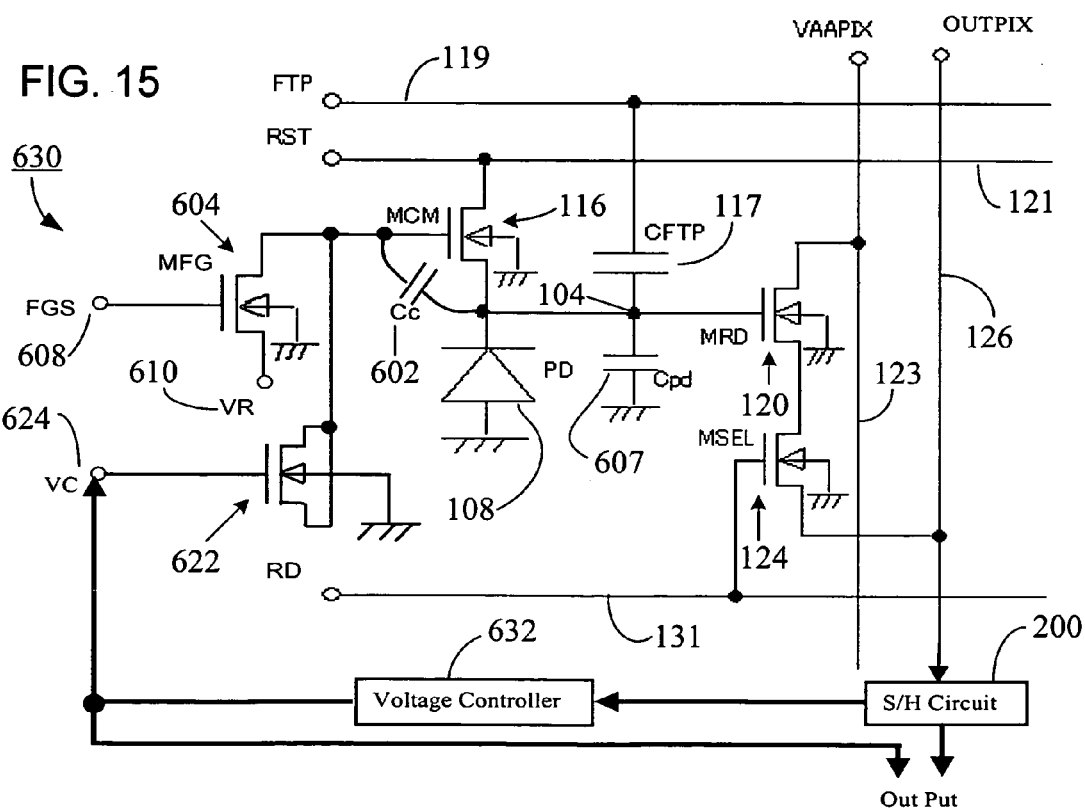
FIG. 15 shows an exemplary L-L pixel imager with adaptive gain control.

FIG. 15 shows an exemplary L-L pixel imager 630 with adaptive gain control. The pixel imager 630 in FIG. 15 is similar to the imager 620 in FIG. 13, except for the addition of the adaptive gain control circuit that includes the sample-and-hold (S/H) circuit 200 (FIG. 1) and a voltage controller 632 as discussed below. As is seen from FIG. 14, the I/O (input/output) gain in the logarithmic region need not be kept constant (e.g., the gain can change with changing values of Cs). In a low light condition, Cs may be set at a small value to get large signal voltage swing. Whereas, in a high light condition, Cs may have a large value. Thus, under changing illumination, it may be desirable to adaptively change the gain in the logarithmic region. The circuit 630 in FIG. 15 achieves such adaptive gain control.

As before, in the circuit of FIG. 15, the (accumulated charge) signals are read out from the OUTPIX terminal 126. The readout signals are sampled and held by the S/H circuit 200 (as also shown in FIG. 1). In the L-L pixel imager 630 of FIG. 15, the peak value of datum (i.e., the sampled output of the S/H circuit 200) is sent to a voltage controller 632 connected to the $V_C$ terminal 624. In a low light condition, a relatively low $V_C$ voltage is applied and, hence, a small value of Cs is obtained from the MOS capacitor 622. In the reverse case (i.e., in a high light condition), a relatively high $V_C$ voltage is applied to the MOS capacitor 622 so as to obtain a large value of Cs. The applied $V_C$ voltage is also read out with the photo signal and reset levels (appearing on the OUTPIX line 126) sampled by the S/H circuit 200. The sampled values of photo signal and reset levels can thus be controlled using $V_C$ voltage data. As a result, an adaptive gain control is realized.

It is noted here that various pixel circuit embodiments discussed above are explained with reference to N-channel MOS transistors. However, it is evident to one skilled in the art that the L-L pixel imagers (e.g., the imagers in FIGS. 2, 10, 13, and 15) according to the present disclosure may be implemented using other types of semiconductor devices such as P-channel MOS transistors, Junction FET's (JFET), bipolar transistors, etc. It is further noted that, for the sake of simplicity, the discussion given hereinbefore with reference to FIGS. 1 and 4-6 is not repeated here for the L-L pixel imagers in FIGS. 10, 13, and 15. However, it is evident that the pixel imagers in FIGS. 10, 13, and 15 may be used in the configuration of FIGS. 1 and 6 in place of the pixel imager 100 in the CMOS imaging device 10. Various other image sensor circuit configurations may also be devised using the pixel sensors of FIGS. 10, 13, and 15.

The discussion hereinabove relates to a linear-logarithmic (L-L) pixel sensor (e.g., the sensor 600 in FIG. 10) that uses a reset transistor (e.g., the transistor 116 in FIG. 10) connected to a photodiode (e.g., the diode 108 in FIG. 10) to balance photo current and overflow current. The overflow current is a sub-threshold current of the reset transistor. The sub-threshold current is exponentially related to Vg (the gate voltage of the reset transistor) and Vs (the source voltage of the reset transistor, which is the same as the voltage of the photodiode). The slope (signal gain) of the sensor output signal in the logarithmic region is determined by the sub-threshold current coefficient ("α") of the reset transistor. As noted before, to increase the signal gain in the logarithmic region, the coefficient should be large. However, the coefficient depends on the gate-channel capacitance and channel-substrate capacitance of the reset transistor, which are semiconductor fabrication process parameters. Therefore, one complex way to change the coefficient is to change these process parameters.

In the present disclosure, a simple system and method are discussed to enlarge the sub-threshold current coefficient "α" of the reset transistor in an L-L pixel sensor without modifying any semiconductor process parameters. In one embodiment, a coupling capacitor (e.g., the capacitor Cc 602 in FIG. 10) is introduced between the gate and source terminals of the reset transistor to decrease an effective change of (Vg-Vs). The gate node of the reset transistor is kept floating and the change in Vs is coupled to Vg by a certain rate with the help of the coupling capacitor. Thus, an effective change in (Vg-Vs) is made small, which is equivalent to enlarging the sub-threshold coefficient "α." In this manner, the signal gain in the logarithmic region can be controlled by changing the coupling capacitance between the source and gate terminals of the reset transistor connected to the photodiode. The signal conversion gain in the logarithmic region is increased, but the gain in the linear conversion region is unchanged. In one embodiment, the stray capacitance (which also affects the value of the enlarged "α") present at the gate terminal of the reset transistor is externally controlled to achieve adaptive gain control of the output signal in the logarithmic region so as to obtain large output photo voltage swings even under varying light conditions.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method of operating a pixel circuit, comprising:
linearly collecting photogenerated charge using a transistor when the amount of said collected charge is below a threshold value;
logarithmically collecting said photogenerated charge by operating said transistor in a sub-threshold mode when the amount of said collected charge is above said threshold value;
controlling a sub-threshold current flowing through said transistor during said logarithmically collecting by having previously selected a value of a first capacitive element positioned between a gate terminal and a source terminal of said transistor so as to provide a desired sub-threshold current coefficient of said transistor, wherein said controlling includes enlarging said sub-threshold current coefficient of said transistor when said transistor is operated in said sub-threshold mode by operating said transistor in a floating-gate state wherein said transistor has a second capacitive element connected to said gate thereof; and
controlling a capacitance of said second capacitive element based on a level of illumination of said pixel circuit.

2. The method of claim 1, wherein operating said transistor in said floating-gate state includes:
operating a switching transistor connected to said gate of said transistor to place the gate of said transistor in a floating state.

3. The method of claim 1, wherein controlling said capacitance of said second capacitive element includes:
increasing said capacitance when said pixel circuit is operated in a high light condition; and
decreasing said capacitance when said pixel circuit is operated in a low light condition.

4. The method of claim 1, wherein said first capacitive element has a fixed capacitance, and wherein said second capacitive element has a variable capacitance.

5. The method of claim 1, wherein said first capacitive element has a value of (Cc+Cs)/Cs, where "Cs" is a stray capacitance present at the gate of said transistor, and "Cc" is an external capacitor connected between the gate and source terminals of said transistor.

6. A method of operating a pixel circuit, including:
collecting photogenerated charge at an integration node in response to a pixel signal during a charge integration period by operating a transistor in a shut-off mode when the amount of said collected charge is below a threshold value to cause charge to be linearly collected at said node, and by operating said transistor in a sub-threshold mode when said collected charge is above said threshold to cause charge to be logarithmically collected at said node;
enlarging a sub-threshold current-coefficient of said transistor when said transistor is operated in said sub-threshold mode by having previously selected a value of a first capacitive element positioned between a gate terminal and a source terminal of said transistor so as to provide a desired enlarging of said sub-threshold current coefficient of said transistor, wherein said enlarging said sub-threshold current coefficient includes operating said transistor in a floating gate state by operating a switching unit connected to said gate of said transistor to place said gate of said transistor in a floating state, wherein said transistor has a second capacitive element connect to said gate thereof; and
controlling a capacitance of said second capacitive element.

7. The method of claim 6, wherein operating said transistor in said floating-gate state includes:
placing the gate of said transistor in a floating state by selective application of a voltage signal to said switching unit connected to the gate of said transistor.

8. The method of claim 7, wherein said switching unit is a transistor.

9. The method of claim 6, wherein controlling said capacitance includes:
increasing said capacitance when said pixel circuit is operated in a high light condition; and
decreasing said capacitance when said pixel circuit is operated in a low light condition.

10. The method of claim 6, wherein controlling said capacitance includes:
varying said capacitance based on a level of illumination of said pixel circuit.

11. The method of claim 6, wherein said second capacitive element is a MOS capacitor.

12. The method of claim 6, wherein said first capacitive element has a value of (Cc+Cs)/Cs, where "Cs" is a stray capacitance present at the gate of said transistor, and "Cc" is an external capacitor connected between the gate and source terminals of said transistor.

13. A pixel circuit, comprising:
a photoconversion device for providing photogenerated charge during a charge integration period;
a first transistor connected to said photoconversion device and operative during said charge integration period to provide a linear accumulation of charge from said photoconversion device up to a predetermined charge level, and to provide a logarithmic accumulation of charge from said photoconversion device after said predetermined charge level is reached; and a control circuit connected to said first transistor, said control circuit including:
  a first capacitive element positioned between a gate terminal and a source terminal of said transistor, said first capacitive element having a predetermined value to provide a desired sub-threshold current coefficient of said transistor during said logarithmic accumulation of charge;
  a second transistor connected between said gate terminal of said first transistor and an external voltage supply;
  a second capacitive element connected between said gate terminal of said first transistor and a ground potential, said second capacitive element being an MOS capacitor; and
  a voltage controller connected to a gate terminal of said MOS capacitor, wherein said voltage controller adjusts a voltage applied to said gate terminal in proportion to said photogenerated charge provided by said photoconversion device.

14. The pixel circuit of claim 13, wherein said second capacitive element additionally represents a stray capacitance present at said gate terminal of said first transistor in said pixel circuit.

15. The pixel circuit of claim 13, wherein said second transistor holds said gate terminal of said first transistor in a floating condition during said charge integration period.

16. The pixel circuit of claim 13, wherein said photoconversion device is a photodiode.

17. The pixel circuit of claim 13, wherein said control circuit enlarges said sub-threshold current coefficient of said first transistor during said logarithmic accumulation of charge.

18. A CMOS imaging device, comprising:
  at least one pixel circuit;
  a sample-and-hold circuit for storing a reset signal and an image signal produced by said pixel circuit;
  an amplifier for subtracting the reset signal and the image signal;
  a digitizer for receiving the output of the amplifier; and
  an image processor for receiving the output of said digitizer, wherein said pixel circuit includes:
    a photoconversion device for providing photogenerated charge during a charge integration period;
    a first transistor connected to said photoconversion device and operative during said charge integration period to provide a linear accumulation of charge from said photoconversion device up to a predetermined charge level, and to provide a logarithmic accumulation of charge from said photoconversion device after said predetermined charge level is reached; and
    a control circuit connected to said first transistor, said control circuit including:
      a first capacitive element positioned between a gate terminal and a source terminal of said transistor, said first capacitive element having a predetermined value which enlarges a sub-threshold current coefficient of said first transistor during said logarithmic accumulation of charge;
      a second transistor connected between a gate terminal of said first transistor and an external voltage supply;
      a second capacitive element connected between said gate terminal of said first transistor and a ground potential; and
      a voltage controller connected to said second capacitive element and said sample-and-hold circuit, wherein said voltage controller varies a capacitance of said second capacitive element in response to a signal received from said sample-and-hold circuit so as to adjust the capacitance of said second capacitive element in proportion to said photogenerated charge provided by said photoconversion device.

19. The imaging device of claim 18, wherein said second transistor holds said gate terminal of said first transistor in a floating condition during said charge integration period.

20. The imaging device of claim 18, wherein said photoconversion device is a photodiode.

21. A pixel circuit, comprising:
  a photoconversion device for providing photogenerated charge during a charge integration period;
  an integration node connected to said photoconversion device;
  a conversion transistor connected to said photoconversion device and operative during said charge integration period to provide a linear accumulation at said integration node of charge from said photoconversion device up to a predetermined charge level, and to provide a logarithmic accumulation at said integration node of charge from said photoconversion device after said predetermined charge level is reached;
  a control circuit connected to said conversion transistor, said control circuit including a first capacitive element positioned between a gate terminal and a source terminal of said conversion transistor, said first capacitive element having a predetermined value which enlarges a sub-threshold current coefficient of said conversion transistor during said logarithmic accumulation of charge;
  a signal controller connected to said pixel circuit for controlling the resetting of, signal accumulation in, and reading out of said pixel circuit;
  a selection transistor, responsive to said signal controller, for selecting when said charge on said integration node is to be read out;
  a readout circuit, responsive to said signal controller, for reading out said charge on said integration node;
  an integration capacitor for accumulating charge at said integration node;
  a feed through pulse line connected to said signal controller and said integration capacitor;
  a reset line connected to said signal controller and said conversion transistor;
  a read line connected to said signal controller and said readout circuit; and
  a voltage supply line connected to said readout circuit, said control circuit further comprising:
    a switching transistor connected between a gate terminal of said conversion transistor and an external voltage supply, wherein said switching transistor holds said first gate terminal in a floating condition during said charge integration period;
    an MOS capacitor connected between said gate terminal of said conversion transistor and a ground potential: and
    a voltage controller connected to a gate terminal of said MOS capacitor, wherein said voltage controller adjusts a voltage applied to said gate terminal of said MOS capacitor in proportion to said photogenerated charge provided by said photoconversion device.

22. The pixel circuit of claim 21, wherein said photoconversion device is a photodiode.

* * * * *

UNITED STATES PATENT AND TRADEMARK OFFICE
CERTIFICATE OF CORRECTION

PATENT NO. : 7,616,242 B2
APPLICATION NO. : 10/869420
DATED : November 10, 2009
INVENTOR(S) : Haruhisa Ando et al.

It is certified that error appears in the above-identified patent and that said Letters Patent is hereby corrected as shown below:

On the Title page, Item (57), under "Abstract", line 11, delete ""α"" and insert -- "α". --, therefor.

In column 16, line 30, in Claim 6, delete "connect" and insert -- connected --, therefor.

In column 18, line 57, in Claim 21, delete "potential:" and insert -- potential; --, therefor.

Signed and Sealed this

Twelfth Day of January, 2010

David J. Kappos
*Director of the United States Patent and Trademark Office*